J. J. Rink.
Sifting Machine.
Nº 71,328. Patented Nov. 26, 1867.
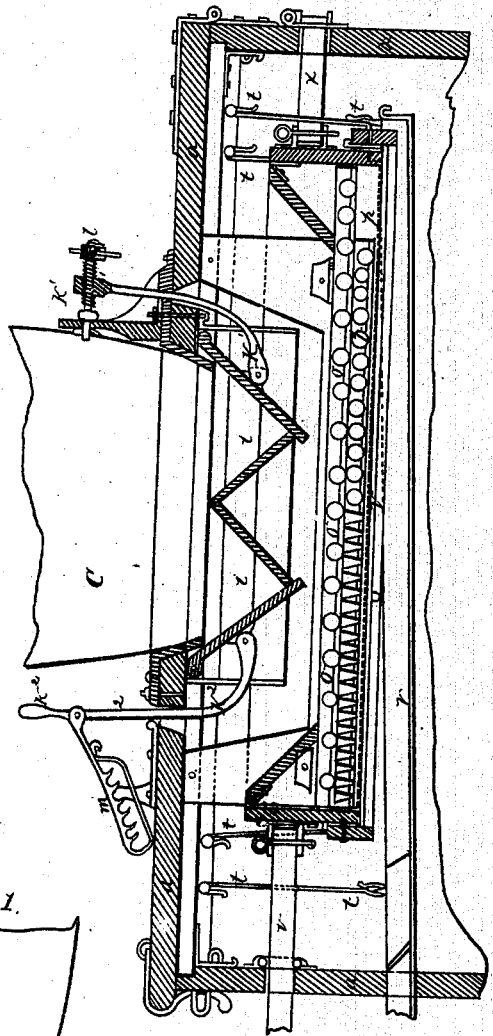
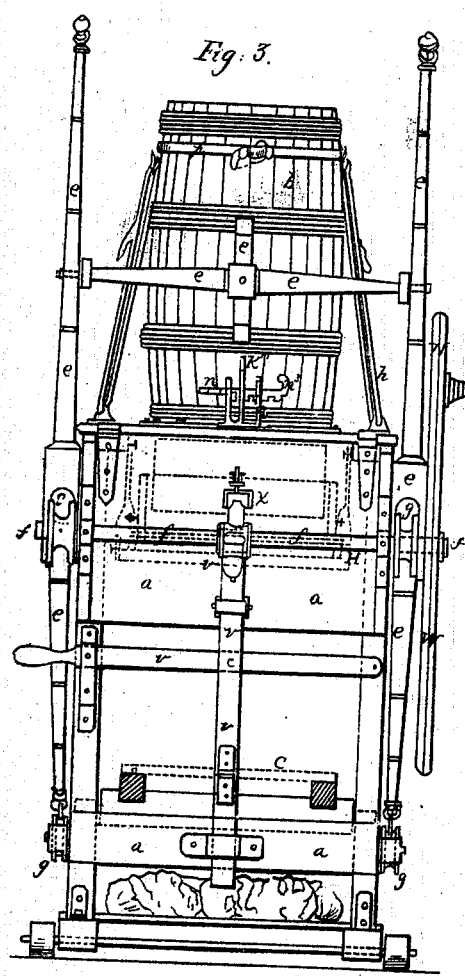
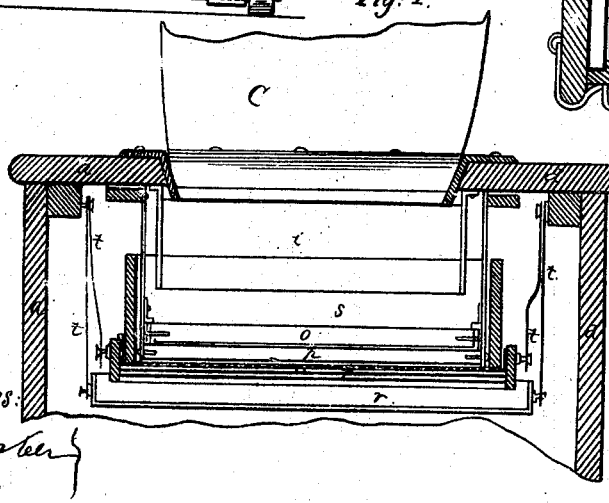
Witnesses:
R. Korber
W. Rink
Inventor:
John Joseph Rink

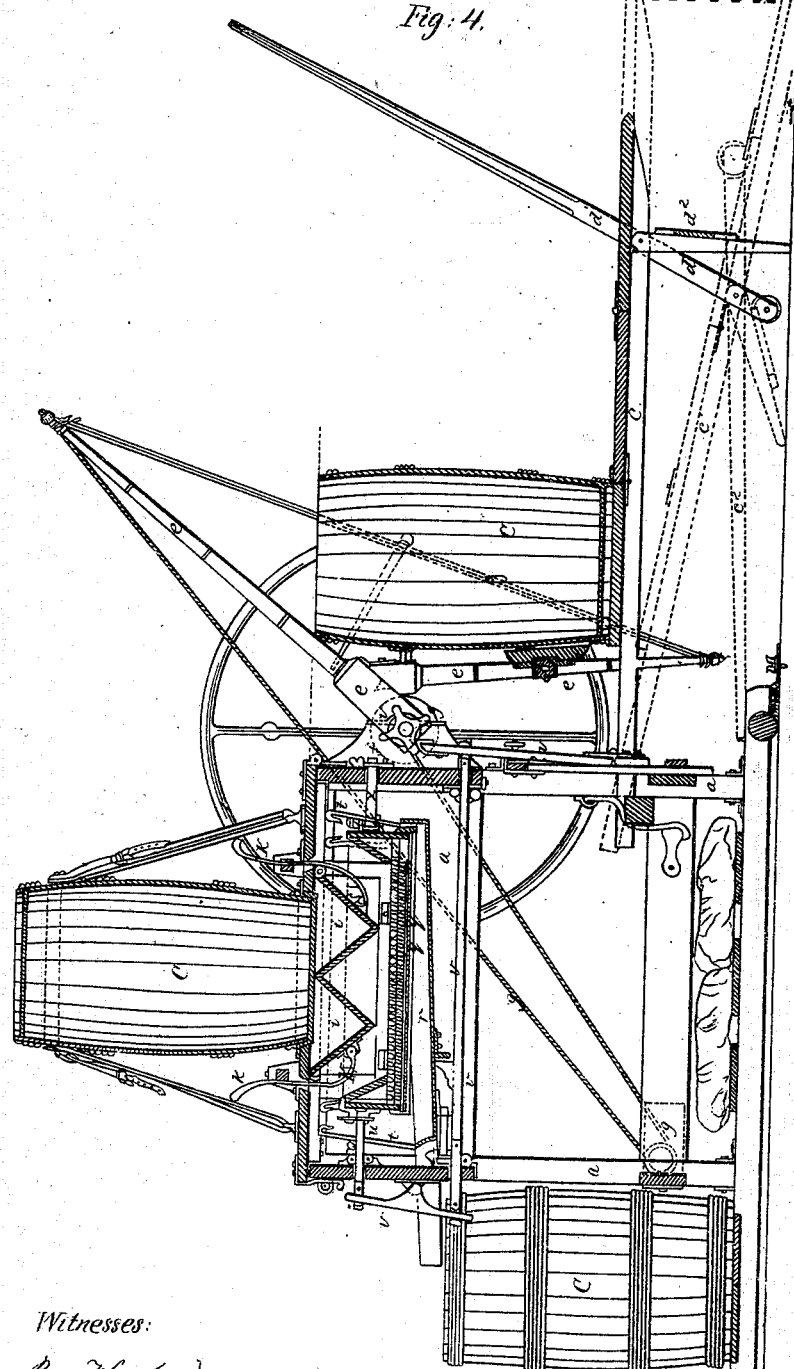

United States Patent Office.

JOHN JOSEPH RINK, OF BROOKLYN, NEW YORK.

Letters Patent No. 71,328, dated November 26, 1867.

IMPROVED SIFTING-MACHINE.

The Schedule referred to in these Letters Patent and making part of the same.

TO ALL WHOM IT MAY CONCERN:

Be it known that I, JOHN JOSEPH RINK, of the city of Brooklyn, in the county of Kings, in the State of New York, have invented a new and useful Machine for Levigating and Sifting Clodded Flour or other substances; and I do hereby declare that the following is a full and exact description thereof, reference being had to the accompanying drawings and to the letters of reference marked thereon, and of which—

Figure I is a transverse section.

Figure II represents a cross-section lengthwise.

Figure III is the frontal,

Figure IV is the profile view, (with partial cross-section.)

The nature of my invention consists in the construction of a machine which will restore to their former uniformity of pulverization, all flour, meal, or other ground or powdered substances, which, by dampness, by tight packing, prolonged storage, or any other reason, have become clodded or lumpy, and require, consequently, renewed labor, costs, and trouble in performing a process of restoration which my machine will do quickly, cheaply, and thoroughly.

To enable those skilled in the art to understand and use my invention, I shall proceed in describing the construction and operation of my machine, and refer to the accompanying drawings and their corresponding numbers and letters.

The barrel $b$ containing the clotted substance is placed upon the platform $c$, and firmly secured thereon by strap-work $h\ h'$. Through the means of the levers $d\ d^1\ d^2$, and as shown by dotted lines $c^1\ c^2$, said platform $c$ can be clapped down so as to facilitate the handling of the barrel. The latter being well strapped on, is now swung easily upon the frame $a$, viz, the top of the machine and such through elevator $e$, which is attached to the shaft $f$, and worked by the pulleys $g\ g$. The barrel thus becomes landed upon frame $a$, head downwards, and the top, now bottom, board can be removed as far as deemed necessary for letting the contents enter the funnels $i\ i$. In Figs. II and IV, these funnels $i\ i$ appear closed. They can be shut or opened, either wholly or partially, as desired, by the means of the handles $k\ k^1\ k^2\ k^3$, which I have designated in different shapes for their being chosen accordingly, $k^1$ being regulated by screw $l$, $k^2\ k^3$ by the toothed bars in shape $m$ or $n$. Next to the funnel-mouth I have placed a grate, $o$, the bars of which are made round and of iron. The fly-wheel $w$ (consequently the machine) being started, this grate $o$ moves to and fro and thus reduces the lumps or clods to fragments which pass through interstices of the bars of the grate $p$ placed beneath $o$, and being attached to the main framework, consequently remain stationary. Said grate $p$ has its bars laid closer to each other than those of grate $o$, so that the flour shovelled and rubbed between said two grates passes already well powdered to the sifter $q$. The bars of grate $p$ can be formed differently, as shown in Fig. II. The sifter $q$ will be perceived to be placed underneath grate $p$, also moves like grate $o$, but in another direction, and sieves the flour into trough $r$, which rests in a declining plane, between the iron suspenders $t\ t$, which are connected with two India-rubber bands $x\ x$, (one on each side,) for the purpose of making the grates and sifter return again to their proper positions. This trough is rocked to and fro by the pin-block $v$. In this manner the sifted flour passes from said trough $r$ into the receiving-vessel. In order to obviate loss of material, the spaces between the funnels $i\ i$ and the grate $o$ have been guarded by the boards $s\ s$. The fineness of the texture of sifter $q$ stands in accordance to that of the material submitted to the process of disclodding. It will thus be apparent, that the automatical movement of the grate $o$ upon and along the immovable grate $p$, the difference in the interstices of the bars of the respective grates $o\ p$, the motion of the sifter $q$, and the rocking arrangement of trough $r$, will separate and crumble the clods, restore the flour, etc., to its former condition, and transfer it in its desired state of uniform fineness from the barrel $b$ through the machine to the receiving-vessel.

What I claim now as my invention, and desire to secure by Letters Patent, is—

1. The arrangement of the elevator $e$, with the strap-work $h\ h'$, for the purpose specified.

2. The combination and arrangement of the grates $o\ p$, and the sifter $q$, for the purpose specified.

3. The construction and arrangement of the levers $k\ k^1\ k^2\ k^3$, regulating the shutting or opening of the funnels $i\ i$, for the purpose as stated and described.

JOHN JOSEPH RINK.

Witnesses:
R. KOERBER,
G. G. ARNOLD.